(12) United States Patent
Koch et al.

(10) Patent No.: US 6,829,409 B2
(45) Date of Patent: Dec. 7, 2004

(54) METHOD FOR HIGHER-ORDER DISPERSION COMPENSATION

(75) Inventors: Barry J. Koch, Blaine, MN (US); Terry L. Smith, Roseville, MN (US); Barbara A. DeBaun, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

(21) Appl. No.: 10/323,301

(22) Filed: Dec. 18, 2002

(65) Prior Publication Data

US 2003/0152321 A1 Aug. 14, 2003

Related U.S. Application Data

(60) Provisional application No. 60/344,965, filed on Dec. 31, 2001.

(51) Int. Cl.[7] .............................. G02B 6/26; G02B 6/34; G02B 27/28

(52) U.S. Cl. .............................. 385/27; 385/37; 385/11; 359/499

(58) Field of Search .............................. 383/27, 37, 11, 383/123, 24, 124, 65; 398/152, 147, 9, 158, 161, 148, 81; 359/188, 290, 161, 158, 177, 183, 156, 140

(56) References Cited

U.S. PATENT DOCUMENTS

| | | | |
|---|---|---|---|
| 5,930,414 A | | 7/1999 | Fishman et al. |
| 5,982,963 A | * | 11/1999 | Feng et al. ............ 385/37 |
| 6,104,515 A | | 8/2000 | Cao |
| 6,271,952 B1 | * | 8/2001 | Epworth ............ 398/147 |

(List continued on next page.)

FOREIGN PATENT DOCUMENTS

| | | |
|---|---|---|
| DE | 19717457 A1 | 10/1998 |
| DE | 199 03 523 A1 | 8/2000 |
| EP | 0 899 602 A | 3/1999 |
| EP | 0 964 237 A1 | 12/1999 |
| EP | 0 982 882 A2 | 3/2000 |
| EP | 0997764 A1 | 5/2000 |
| EP | 1087245 A1 | 3/2001 |
| JP | 7-231291 | 8/1995 |
| JP | 10-293280 | 11/1998 |

(List continued on next page.)

OTHER PUBLICATIONS

Heismann, et al; "Automatic Compensation of First–Order Polarization Mode Dispersion in a 10 Gb/s Transmission System", *Proceedings of the European Conference on Optical Communication* (Sep. 20–24, 1998); vol. 1; pp. 529–530.

(List continued on next page.)

*Primary Examiner*—Frank G. Font
*Assistant Examiner*—James P. Hughes
(74) *Attorney, Agent, or Firm*—Gregg H. Rosenblatt

(57) ABSTRACT

A method for compensating for higher-order dispersion of an incoming optical communications signal in accordance with the present invention includes the steps of compensating the signal for first order polarization mode dispersion; compensating the signal for second order polarization mode dispersion; and compensating the signal for variable chromatic dispersion. Additionally, the method may include the steps of compensation for fixed chromatic dispersion and controlling the polarization of the incoming signal. The signal may be monitored after the compensating steps and the degree of compensation may be tuned based on the monitoring. The step of compensating the signal for first order polarization mode dispersion may include the steps of controlling the polarization of the signal; splitting the signal into a first and a second orthogonal polarization components; reflecting the first polarization component in a fixed linearly chirped grating; reflecting the second polarization component in a tuned linearly chirped grating; and recombining the first and the second polarization components.

19 Claims, 4 Drawing Sheets

U.S. PATENT DOCUMENTS

| | | | | |
|---|---|---|---|---|
| 6,330,383 | B1 | * | 12/2001 | Cai et al. ............... 385/37 |
| 6,385,357 | B1 | * | 5/2002 | Jopson et al. ............ 385/11 |
| 6,459,838 | B1 | | 10/2002 | Varner |
| 6,483,958 | B2 | * | 11/2002 | Bandemer et al. ........ 385/11 |
| 6,633,704 | B2 | * | 10/2003 | Kohnke et al. ........... 385/39 |
| 6,658,215 | B1 | * | 12/2003 | Strasser et al. .......... 398/152 |
| 2001/0028760 | A1 | * | 10/2001 | Yaffe ..................... 385/27 |
| 2002/0094165 | A1 | * | 7/2002 | Rothenberg ............. 385/37 |
| 2002/0159672 | A1 | * | 10/2002 | Fells et al. .............. 385/13 |
| 2003/0081894 | A1 | * | 5/2003 | Gao et al. ............... 385/27 |
| 2003/0086647 | A1 | * | 5/2003 | Willner et al. ........... 385/37 |
| 2004/0161243 | A1 | * | 8/2004 | Ooi et al. ................ 398/152 |

FOREIGN PATENT DOCUMENTS

| | | |
|---|---|---|
| JP | 2001-053679 | 2/2001 |
| WO | WO 00/50944 | 8/2000 |
| WO | WO 00/60776 | 10/2000 |
| WO | WO 01/27667 A2 | 4/2001 |
| WO | WO 02/25845 A2 | 3/2002 |

OTHER PUBLICATIONS

Erro, M.J., et al; "Electrically Tunable Dispersion Compensation System," *Lasers and Electro–Optics Society Annual Meeting, 1998* (Dec. 1–4, 1998); IEEE, Piscataway, NJ; ISBN 0–7803–4947–4; pp. 309–310.

D. Sobiski, et al; "Fast First–Order PMD Compensation with Low Insertion Loss for 10 Gbit/s System", *Electronics Letters* (Jan. 4, 2001); vol. 37, No. 1; pp. 46–48.

H. Rosenfeldt, et al, "PMD Compensation in 10 Gbit/s NRZ Field Experiment Using Polarimetric Error Signal", *Electronics Letters* (Mar. 2, 2000); vol. 36, No. 5; pp. 448–450.

R. Noé, et al; "Polarization Mode Dispersion Compensation at 10, 20, and 40 Gb/s with Various Optical Equalizers", *Journal of Lightwave Technology* (Sep. 1999); vol. 17, No. 9; pp. 1602–1616.

D. A. Watley, et al; "Compensation of Polarisation–Mode Dispersion Exceeding One Bit Period Using Single High–Birefringence Fibre", *Electronics Letters* (Jun. 24, 1999); vol. 35, No. 13, pp. 1094–1095.

T. Ozeki, et al; "Polarization–Mode–Dispersion Equalization Experiment Using a Variable Equalizing Optical Circuit Controlled by a Pulse–Waveform–Comparison Algorithm", *OFC '94 Technical Digest* (1994); Tuesday Afternoon; pp. 62–64.

T. Takahashi, et al; "Automatic Compensation Technique for Timewise Fluctuating Polarisation Mode Dispersion in In–Line Amplifier Systems", *Electronics Letters* (Feb. 17, 1994); vol. 30, No. 4; pp. 348–349.

H. Bülow, et al; "PMD Mitigation at 10 Gbit/s Using Linear and Nonlinear Integrated Electronic Equaliser Circuits", *Electronics Letters* (Jan. 20, 2000); vol. 36, No. 2; pp. 163–164.

P. Ciprut, et al; "Second–Order Polarization Mode Dispersion: Impact on Analog and Digital Transmissions", *Journal of Lightwave Technology* (May 1998); vol. 16, No. 5; pp. 757–771.

T. Kudou, et al; "Theoretical Basis of Polarization Mode Dispersion Equalization up to the Second Order", *Journal of Lightwave Technology* (Apr. 2000); vol. 18, No. 4; pp. 614–617.

C.K. Madsen, "Optical All–Pass Filters for Polarization Mode Dispersion Compensation", *Optics Letters* (Jun. 15, 2000); vol. 25, No. 12; pp. 878–880.

M. Romagnoli, et al; "Time–Domain Fourier Optics for Polarization–Mode Dispersion Compensation", *Optics Letters* (Sep. 1, 1999); vol. 24, No. 17; pp. 1197–1199.

M. Shtaif, et al; "A Compensator for the Effects of High–Order Polarization Mode Dispersion in Optical Fibers", *IEEE Photonics Technology Letters* (Apr. 2000); vol. 12, No. 4; pp. 434–436.

H.Rosenfeldt, et al; "First Order PMD–Compensation in a 10Gbit/s NRZ Field Experiment Using a Polarimetric Feedback–Signal", *25th Proceedings of the European Conference on Optical Communication, ECOC'99* (Sep. 26–30, 1999); Nice, France; pp. ll–134—11–135.

Patscher, J. & Eckhardt, R.; "Component for Second–Order Compensation of Polarisation–Mode Dispersion," *Electronics Letters* (Jun. 19, 1997); vol. 33, No. 13; pp. 1157–1158.

\* cited by examiner

METHOD FOR HIGHER-ORDER DISPERSION COMPENSATION

RELATED APPLICATIONS

The present application is related to and claims priority from the co-pending, commonly assigned U.S. applications entitled, "System for Polarization Mode Dispersion Compensation", USPTO Ser. No. 10/036,987, and "Method for Polarization Mode Dispersion Compensation", USPTO Ser. No. 10/037,024, both of which are incorporated by reference. This application also is related to and claims priority from provisional application "Method And System For Higher Order Dispersion Compensation", USPTO Ser. No. 60/344,965, filed Dec. 3, 2001 which also is hereby incorporated by reference.

BACKGROUND OF THE INVENTION

The present invention relates to a method and system for dispersion compensation of optical signals. In particular, the present invention relates to a method for higher-order dispersion compensation using at least two chirped Bragg gratings to selectively tune the reflection points of two polarization resolved signals, creating a variable higher-order dependent delay.

Present day telecommunication systems require that optical signals be conveyed over very long distances. In an optical communications signal, data is sent in a series of optical pulses. Signal pulses are composed of a distribution of optical wavelengths and polarizations, each of which travels at its own characteristic velocity. This variation in velocity leads to pulse spreading and thus signal degradation. Degradation due to the wavelength dependence of the velocity is known as chromatic dispersion, while degradation due to the polarization dependence is known as polarization mode dispersion (PMD).

Mathematically, the velocity of light v in a waveguide is given by $$v = \frac{c}{n} \qquad (1)$$

where c is the velocity of light in free space and n is the effective index of refraction in the waveguide.

Normally, the effective index, n, of the optical medium is dependent upon the wavelength of the light component. Thus, components of light having different wavelengths will travel at different speeds.

In addition to being dependent upon wavelength, the effective index in a waveguide also may be dependent upon the polarization of the optical signal. Even in "single-mode" fiber, two orthogonal polarizations are supported and, in the presence of birefringence, the polarizations travel at different speeds. Birefringence in the fiber may arise from a variety of sources including both manufacturing variations and time-dependent environmental factors. The speed difference results in a polarization-dependent travel time or "differential group delay" (DGD) between the two different polarization modes within the birefringent fiber. In real optical fiber systems, the magnitude of birefringence and the orientation of the birefringent axes vary from place to place along the fiber. This results in a more complex effect on the optical signal, which is characterized by the concept of "principal states of polarization" or PSPs. PSPs are defined as the two polarization states that experience the maximum relative DGD, and they uniquely characterize the instantaneous state of the system.

Polarization mode dispersion (PMD) is measured as the distortion arising from the statistical sum of the different group velocities of the two components of polarization as the signal propagates through the different sections of the optical communications system. PMD includes first order PMD and higher-order PMD and is non-deterministic. First order PMD is the differential polarization group delay at a given wavelength. The instantaneous value for a long fiber may vary over both long time intervals, due to slow variations such as temperature drift, and short time intervals, due to fast variations such as mechanical vibration induced polarization fluctuations. The coefficient describing the mean value of first order PMD may vary from more than 2 ps km$^{1/2}$ for relatively poor PMD performance fiber to less than 0.1 ps/km$^{1/2}$ for relatively good PMD performance fiber.

Second order PMD arises mainly from two sources: i.) a first order PMD that varies with wavelength; ii.) a change of the system PSP (principal state of polarization) orientation with wavelength, which results in a variation of PMD with wavelength. Second order PMD results in a wavelength dependent group delay, which is equivalent in effect to variable chromatic dispersion, and can have either a negative or positive sign. The speed of fluctuation is on the same order as the speed of fluctuation of first order PMD.

There are two types of chromatic dispersion: deterministic and variable. Deterministic dispersion is the set chromatic dispersion per unit length of waveguide having a fixed index of refraction. Deterministic dispersion is relatively fixed (e.g., ~17 ps/nm*km for standard single mode fiber) for a given set of environmental conditions. For example, 17 ps/nm*km means that a ten kilometer (10 km) system, carrying data with a bandwidth of 0.1 nanometers (nm), will experience approximately 17 picoseconds (ps) of chromatic dispersion.

Variable chromatic dispersion is caused by changes in fiber link length, due to adding or dropping channels for example, and by tensile stresses and/or fluctuations in temperature. Reasonable values to be expected for the amount that the chromatic dispersion will change are in the range −500 ps/nm to +500 ps/nm.

In addition to the effects of PMD and chromatic dispersion alone, there is a higher-order dispersion cross term that arises from the simultaneous presence of both chromatic dispersion and PMD. This cross term between chromatic dispersion and second order PMD has a mean value of zero, but may have a non-zero root-mean-square (RMS) contribution. Similarly to second order PMD terms, the RMS value may have a positive or negative contribution. The magnitude of the RMS contribution may vary from less than 1% of the chromatic dispersion to the same order as the chromatic dispersion, depending on the PMD coefficient of the fiber.

Dispersion imposes serious limitations on transmission bandwidth, especially across long distances, such as in transoceanic routes. Dispersion issues become much more important at higher bit rates, where the separation between the optical pulses is less and where shorter pulses result in a wider signal spectral bandwidth, exacerbating chromatic and higher-order PMD effects. At bit rates greater than or equal to 40 Gb/s, even for "good" fiber ($\leq 0.1$ ps/km$^{1/2}$ PMD coefficient), long length links are deemed to require higher-order dynamic compensation. Dispersion may become an inhibiting factor either limiting overall system length or increasing system costs due to the need for additional optical-to-electrical-to-optical signal conversion sites to permit electrical signal regeneration.

Higher-order dispersion has not been adequately recognized, measured and addressed in past dispersion compensation devices. An understanding of the sources and factors in higher-order dispersion is important in providing a higher-order dispersion compensation solution.

Exemplary calculations for a "good" fiber
(PMD coefficient of 0.1 ps/km$^{1/2}$) show:

| | |
|---|---|
| Chromatic Dispersion term: | 17 ps/nm * km |
| First order PMD coefficient: | 0.1 ps/km$^{1/2}$ |
| Second order PMD coefficient: | 0.006 ps/nm * km |
| Cross term RMS magnitude: | 0.37 ps/nm * km |

Exemplary calculations for a "poor" fiber (1 ps/km$^{1/2}$) show:

| | |
|---|---|
| Chromatic Dispersion term: | 17 ps/nm * km |
| First order PMD coefficient: | 1 ps/km$^{1/2}$ |
| Second order PMD coefficient: | 0.6 ps/nm * km |
| Cross term RMS magnitude: | 3.7 ps/nm * km |

The second order coefficient of PMD may be calculated based on the theory described in "Second-Order Polarization Mode Dispersion: Impact on Analog and Digital Transmissions," *IEEE J. of Lightwave Tech.*, JLT-16, No. 5, pp. 757-771, May 1998, which is hereby incorporated by reference.

$$\text{Second order PMD coefficient} = (\text{First order PMD coefficient})^2 / 1.\widetilde{23}$$

Equation 2 only accounts for the root-mean-square (RMS) of the resulting chromatic dispersion. The cross term was calculated to be:

$$\text{Cross term} = (17)^{1/2} * (\text{First order PMD coefficient})^{1/2} * 1.16 \quad (3)$$

Therefore, it may be appreciated that for fiber that has a high PMD coefficient, PMD may cause a problem when only fixed chromatic dispersion compensation is used due to accumulated chromatic dispersion through the second order PMD term and the cross term. This leads to a high value of uncompensated dispersion as fiber PMD coefficients become larger or as the bit rate gets higher.

From this analysis, it may be calculated that even using the best of fiber produced today (assuming ~0.025 ps/km$^{1/2}$), propagation distances are likely limited to ≤3000 km (dispersion <0.3*100 ps) for 10 Gb/s transmission and ≤200 km (dispersion <0.3*25 ps) for 40 Gb/s without performing dynamic chromatic dispersion compensation to eliminate the effects of the 2nd order PMD and cross terms.

A number of literature articles attempt to address the issue of higher-order dispersion compensation. One approach is to use a multi-section PMD compensator. Such an approach is likely to be expensive and also will be limited in the amount of variable chromatic dispersion compensation available. Another approach is to selectively add specific chirps to various portions of the pulse and to send the pulse through a high dispersion element with the correct sign to compress the pulse. Such an approach may account for all types of dispersion. However, such an approach is likely to be expensive due to the need for clock recovery and phase modulation and also only may be useable at the receiver terminal. Furthermore, it only may work if the residual dispersion is low.

The need remains for a dispersion compensation system that dynamically adjusts not only for PMD, but also for chromatic dispersion and higher-order dispersion. Increased telecommunications system requirements, such as the need to compensate for fluctuations in temperature and the possibility of variable path lengths due to the optical add/drop systems envisioned in the near future, call for a compensation system that is dynamic and cost-efficient.

SUMMARY OF THE INVENTION

The present invention relates to a higher-order dispersion compensator for tuning a signal having a first polarization mode dispersion component, a second order polarization mode dispersion component, and a variable chromatic dispersion component.

The compensator includes a first tuning element that adjusts the first order polarization mode dispersion component of the polarization controlled signal and a second tuning element that adjusts the second order polarization mode dispersion component and the variable chromatic dispersion component of the polarization controlled signal. The compensator may further include a polarization controller that converts incoming light of an arbitrary polarization to a polarization controlled signal having a desired state of polarization.

In one embodiment, the first tuning element may comprise a differential higher-order delay line including a polarization beam splitter/combiner coupled to receive the polarization controlled signal, where the polarization beam splitter splits the polarization controlled signal into a first polarization component and a second orthogonal polarization component. A first waveguide having a first grating tuned to reflect the first polarization component and a first reference reflection point is optically coupled to receive the first polarization signal. A second waveguide having a second grating tuned to reflect the second polarization component and having a second reference reflection point is optically coupled to receive the second polarization signal. The first waveguide has a first chirped grating tuned to reflect the first polarization signal at a first reference reflection point. The second waveguide is optically coupled and aligned to the second output port of the splitter. The second waveguide has a second chirped grating tuned to reflect the second polarization signal and has a second reference reflection point. Depending on the embodiment of the present invention, the chirp of the gratings may be linear, non-linear, or may have a more complex spatial dependence. For certain applications, the length of the gratings may be equal or greater than one meter.

In this first exemplary embodiment, both gratings are Bragg gratings linearly chirped to perform first order PMD compensation and fixed chromatic dispersion compensation. A first tuning mechanism tunes one of the gratings, such as by mechanically stressing the gratings.

In other embodiments, both gratings may be non-linearly chirped to perform first and second order PMD compensation as well as both fixed and variable chromatic dispersion compensation. Other, more complicated, chirp patterns may be chosen to perform more specific or higher-order (third, fourth, etc. order) compensation.

The first grating and the second grating may both have substantially same reflection profiles and substantially same chirp rates; and the first and second reference reflection points may be at substantially a same optical path length. Alternatively, prior to adjustment by the tuning mechanism, one of the reflection points of the gratings may be at a shorter optical path length from the split point than the second reflection point.

The second tuning element may include a third waveguide having a third non-linearly chirped Bragg grating and a second tuning mechanism that tunes the third grating. The range of chirp values in the third non-linearly chirped Bragg grating may determine the relative range of variable chromatic dispersion compensation.

The system may further include a static chromatic dispersion component comprising an average chirp rate of the first and second gratings that corresponds to the amount of fixed chromatic dispersion to be compensated.

Circulators may be used to route the optical signals. One embodiment includes a four-port circulator, the circulator having an input port optically coupled to receive the polarization control signal, a first recirculation port optically coupled to transmit the controller output signal to the differential polarization delay line and to receive the delay line output, a second recirculation port optically coupled to transmit the delay line output signal to the second tuning element and to a second tuning element output signal, and an output port optically coupled to transmit a final output signal.

In another exemplary embodiment, the first tuning element and the second tuning element comprise a polarization beam splitter coupled to receive the polarization controlled signal, where the polarization beam splitter splits the polarization controlled signal into a first polarization component and a second orthogonal polarization component. A first waveguide is optically coupled to receive the first polarization signal, the first waveguide having a first non-linearly chirped grating tuned to reflect the first polarization signal and having a first reference reflection point. A second waveguide is optically coupled to receive the second polarization signal, the second waveguide having a second non-linearly chirped grating tuned to reflect the second polarization signal and having a second reference reflection point. A first tuning mechanism tunes both the first and the second grating simultaneously and a second tuning mechanism tunes the second grating independently of the first grating. The compensator may have a static chromatic dispersion compensation element, wherein the average chirp rate of the first and second gratings correspond to the amount of fixed chromatic dispersion to be compensated.

In this embodiment, the first order polarization mode dispersion compensation element includes the second tuning mechanism and the second grating and the first order polarization mode dispersion compensation is achieved by tuning the second non-linearly chirped grating separately from the first grating. The second order polarization mode dispersion compensation and variable chromatic dispersion compensation elements include the first and second grating and the first tuning mechanism and variable chromatic dispersion compensation and higher-order polarization mode dispersion compensation are achieved by tuning the first and second gratings in unison.

In yet another embodiment, the higher-order dispersion compensator comprises a chromatic dispersion compensator coupled to receive an input signal; a phase modulator optically coupled to the chromatic dispersion compensator, wherein the phase modulator selectively chirps portions of the data pulses; and a tunable dynamic dispersion element coupled to receive the phase modulated signal. The tunable dynamic dispersion element includes a first waveguide having a first non-linearly chirped grating tuned to reflect the polarization controlled signal and having a first reference reflection point; and a first tuning mechanism that tunes the first grating.

The compensator may include a signal analyzer optically coupled to evaluate the signal reflected by the grating and provide control signals to the tuning mechanism accordingly. The signal analyzer further may provide control signals to the phase modulator.

The waveguides are exemplarily optical fibers. In specific embodiments, the waveguides may be optical single-mode polarization-maintaining (PM) fibers, polarizing (PZ) fibers, and/or shaped optical fibers.

The compensator may be an adaptive compensator further including a signal analyzer, which provides control signals to at least one of the tuning mechanisms.

The dispersion compensator may be at least partially integrated into an integrated optical chip, such as a lithium niobate chip. The waveguides may be channel waveguides. Alternative tuning mechanisms may tune the gratings acoustically, thermally, electro-optically, or mechanically.

A method for compensating for higher-order dispersion of an incoming optical communications signal in accordance with the present invention includes the steps of compensating the signal for first order polarization mode dispersion; compensating the signal for second order polarization mode dispersion; and compensating the signal for variable chromatic dispersion. Additionally, the method may include the steps of compensation for fixed chromatic dispersion and controlling the polarization of the incoming signal. The signal may be monitored after the compensating steps and the degree of compensation may be tuned based on the monitoring.

The step of compensating the signal for first order polarization mode dispersion may include the steps of controlling the polarization of the signal; splitting the signal into a first and a second orthogonal polarization components; reflecting the first polarization component in a fixed linearly chirped grating; reflecting the second polarization component in a tuned linearly chirped grating; and recombining the first and the second polarization components.

The step of compensating the signal for second order polarization mode dispersion may comprise the step of reflecting the signal in a tuned non-linearly chirped grating.

In a particular embodiment of the method of the present invention, the method includes the steps of:

adjusting the state of polarization of the incoming optical communications signal to correctly align the principal states of polarization of the communications signal to the principal states of polarization of the compensator system;

splitting the communications signal into a first and a second orthogonal principal states of polarizations at a split point;

directing the first of the polarization states to a first waveguide having a first non-linearly chirped grating having a first reference reflection point;

directing the second of the polarization states to a second waveguide having a second non-linearly chirped grating having a chirp pattern substantially similar to that of the first chirped grating and having a second reference reflection point;

adjustably varying the chromatic dispersion of the first and second reflections by varying the position of the first and second reflection points along the gratings;

adjustably varying the relative optical path lengths between the first and second reflection points and the split point to compensate for polarization dispersion between the first and second orthogonal states of polarization; and recombining the first and second polarization states into an output signal.

The method may further include the steps of sampling the quality of the output signal. Using the quality readings, the method may include the steps of:

adaptively adjusting the state of polarization of the incoming signal and the optical path length of the second reflection point with respect to the split point to compensate for first-order polarization mode dispersion in response to the quality of the output signal, and/or adaptively adjusting one or both of the first and second reflection points with respect to the split point in order to compensate for the dispersion in the signals.

Prior to the step of adjustably varying the optical path length from the second reflection point, the optical path length of at least one of the gratings may be tuned such that the second reflection point is at a desired point, for example, at substantially the same optical path length or at a different path length from the split point as the first reflection point. The difference may be selected according to an expected polarization dispersion delay between the first and second orthogonal states of polarization.

In another embodiment of a method for compensating for higher-order dispersion of an optical communications signal in accordance with the present invention, the method comprises the steps of:

splitting the communications signal into a first and a second orthogonal principal polarization states;

directing the first polarization state to a first high-birefringence optical waveguide having a first linearly chirped grating, the first optical waveguide having a first reflection point at a first optical path length;

directing the second polarization states to a second tunable high-birefringence optical waveguide having a second linearly chirped grating, the second optical waveguide having a second reflection point at a second optical path length;

recombining the first and second polarization states into an output signal;

directing the output signal to a third high-birefringence optical waveguide having a non-linearly chirped grating with a reflection point;

adjustably varying the second optical path length of the second linearly chirped grating to compensate for polarization dispersion between the first and second orthogonal states of polarization; and adjustably varying the optical path in the third grating to compensate for higher-order dispersion in the output signal.

The second chirped grating may have a chirp pattern substantially similar to the first chirped grating, the second grating having a second reflection point that is substantially at the same optical path length from the split point as the first reflection point. Again, the output signal ay be sampled the state of polarization of the incoming signal and the optical path length of the second reflection point may be adjusted in response to the quality of the output signal.

DETAILED DESCRIPTION OF THE INVENTION

The present invention is directed to a method and a system for higher-order dispersion compensation (HDC), which may simultaneously compensate for the effects of higher-order dispersion composed of chromatic dispersion, polarization mode dispersion, higher-order polarization mode dispersion, and variable chromatic dispersion while minimizing optical loss and equipment overhead. Higher-order dispersion compensation is defined to include chromatic, polarization mode, second order polarization mode, and variable chromatic dispersion compensation.

An exemplary embodiment of the present invention relates to an adaptive higher-order dispersion compensator system. The system includes a polarization controller, a differential polarization delay unit, a dynamic chromatic dispersion compensation element, and a fixed chromatic dispersion element. In various forms of the present invention, these tasks are performed by two, three, or four elements. For example, in one embodiment all four tasks may be performed by separate elements, whereas in another embodiment all tasks except polarization control are performed by one compensation element.

Chirped reflection gratings in waveguides, such as fiber Bragg gratings (FBGs), are used to create a time delay between orthogonal polarizations. In one exemplary embodiment of the current invention, at least two chirped Bragg gratings are used to create a time delay between orthogonal polarizations, while inducing a correcting amount of chromatic dispersion, depending on the chirp of the gratings and the tuning level of the gratings. A signal analysis method indicates the level of a specific dispersion component, or the level of all dispersion components, and a control scheme will use the signal analysis results to optimize the system.

Figure 1:
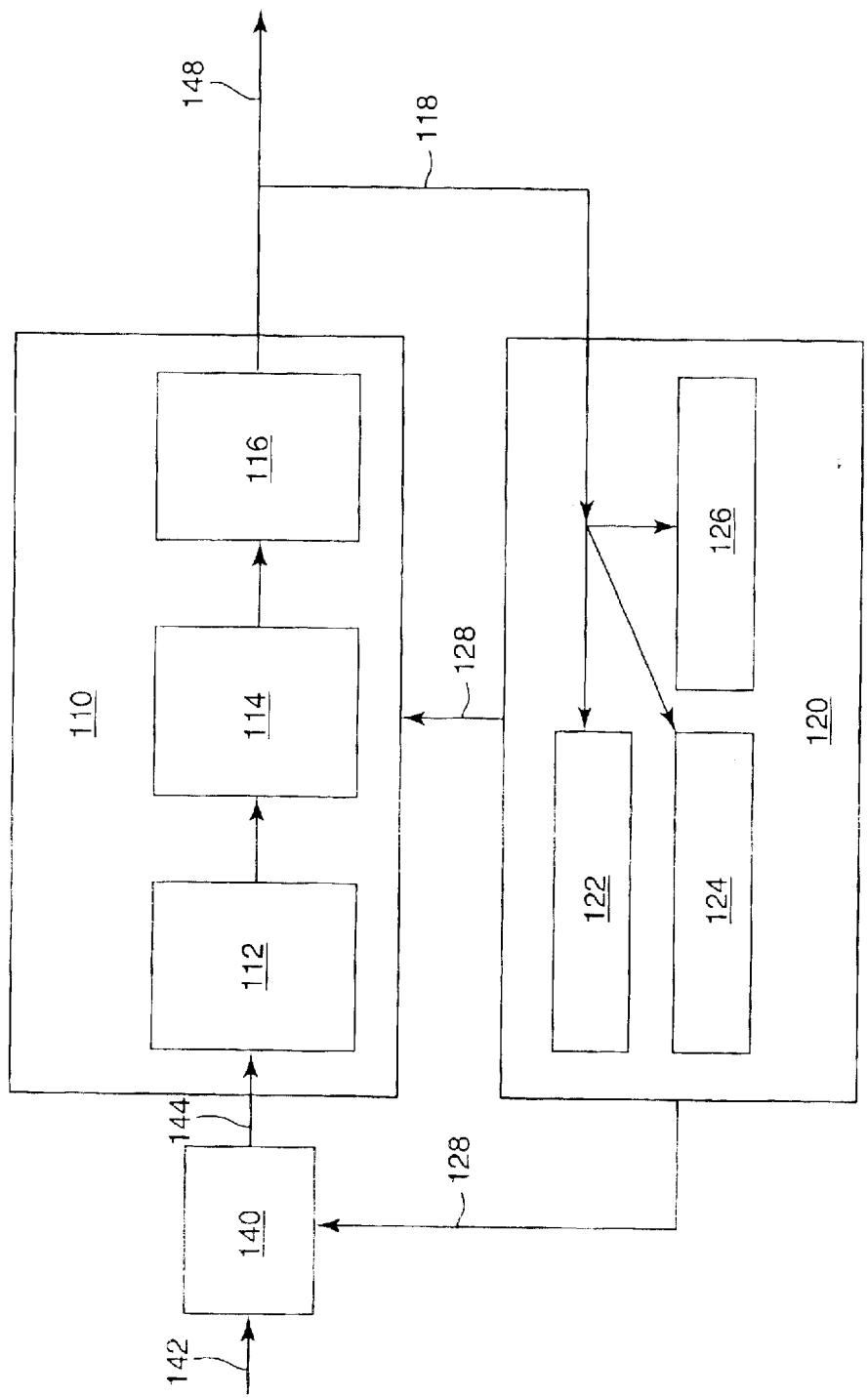
FIG. 1 is a schematic component flow diagram for the dynamic, higher-order dispersion compensation method in accordance with the present invention.

Signals to be compensated may include a first polarization mode dispersion component, a second (and/or higher) order polarization mode dispersion component, a variable (or dynamic) chromatic dispersion component, and/or a static (or fixed) chromatic dispersion component. FIG. 1 is a process diagram of the steps of an exemplary method used in providing higher-order dispersion compensation to a signal according to the present invention. The incoming signal 142 traverses a polarization controller 140, which converts light of an arbitrary incoming polarization to a controlled output signal 144 having a desired state of polarization. The controlled output signal goes through a fixed chromatic dispersion compensator 112 that minimizes the total pulse distortion. The amount of negative chromatic dispersion introduced depends on the expected link length leading up to the compensator. For many of the embodiments discussed, this function will be performed simultaneously with the following step due to the use of chirped fiber Bragg gratings.

The signal output is sent through a first order PMD compensator 114. Then, the resulting signal is sent through a variable chromatic dispersion compensator 116, which compensates both for any dynamic chromatic dispersion as well as any residual second order PMD. Finally, the resulting compensated output signal 148 is monitored through an optical signal tap 118 by a signal analysis module 120, which outputs control signals 128 to control components, such as the polarization controller 140 and the appropriate dispersion compensation elements 110.

The grating period Λ that will most strongly reflect an optical signal of a vacuum wavelength λ is given by $$\Lambda = \lambda/2n \qquad (4)$$

where n is the effective index of the waveguide. Thus, by controlling Λ(x), the reflection point and therefore the propagation time, of the signal pulse in the grating may be controlled. Furthermore, the chromatic dispersion imparted to a signal being reflected from a chirped grating of period Λ(x) which has a corresponding gradient in period (or "chirp") dΛ/dx along the grating is given by $$D = (c^* d\Lambda/dx)^{-1} \qquad (5)$$

By properly designing and tuning the grating period Λ(x), one may control both the chromatic dispersion and the total delay experienced by the pulse in the grating.

The type and number of dispersion measurement techniques used may vary depending on the situation. FIG. 1 illustrates the use of three techniques: DOP Measurement 122, Sub-harmonic filtering 124, and/or frequency modulation 126. There may be advantages to using two or more measurement techniques simultaneously, such as degree of polarization monitoring and electrical sub-harmonic frequency filtering. However, this may add to the cost of the compensator and therefore it may be desirable to use only one technique. Other measurement techniques or variations of the techniques shown may be advantageous. Some examples are: transversal filtering; DOP measurement with scanning filter; or direct eye analysis using a Bit Error Rate Tester or Digital Communications Analyzer. Both feedforward and feedback measurement techniques may be used appropriately to analyze the signal.

Certain compensation elements from the embodiment illustrated in FIG. 1 could be combined with various feedforward approaches or with a phase modulation compensation approach to get additional functionality.

Figure 2:
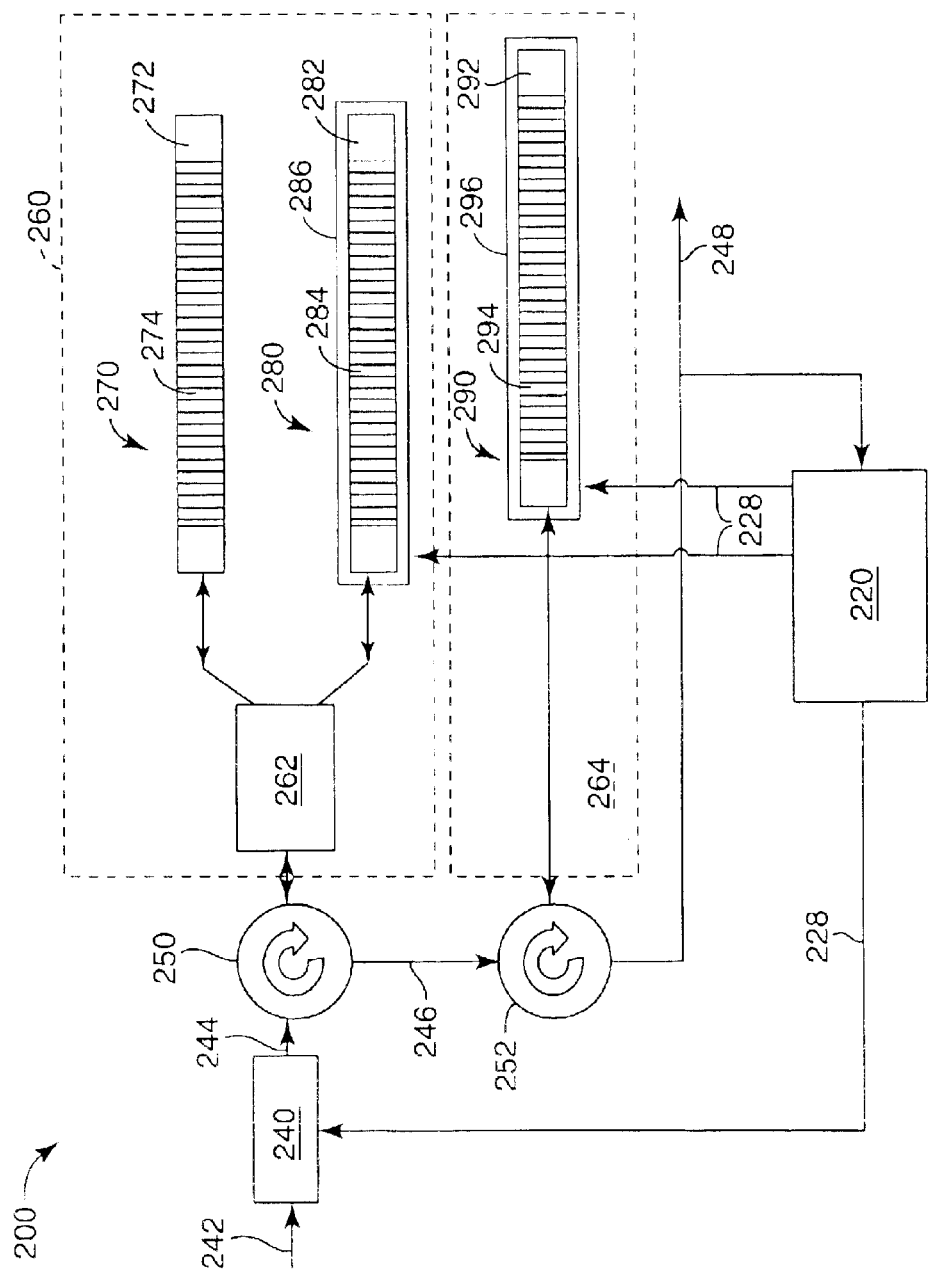
FIG. 2 is a schematic representation of a first embodiment of a dynamic, higher-order dispersion compensation system in accordance with the present invention.

FIG. 2 is a schematic diagram of a first embodiment of a higher order compensation system 200 in accordance with the current invention where the second order dispersion and the first order dispersion are compensated for by separate compensation elements. A communications signal 242 enters the system through polarization controller 240, wherein the polarization state of the incoming signal 242 is modified.

The resulting controller output signal 244 then goes through a first circulator 250. The circulator 250 has an input port coupled to receive the controller output signal 244, a recirculation port optically coupled to transmit the controller output signal to a first order PMD and fixed chromatic dispersion compensation element comprising, in the present example, a differential delay line 260, (and to provide a return path for the reflected signal), and an output port coupled to transmit the reflected signal 246 to another circulator 252.

The differential delay line 260 includes a polarization beam splitter/combiner 262, a first fixed delay element 270, and a second tunable delay element 280. The polarization beam splitter 262 splits the controller output signal into two orthogonal polarization components. One polarization component travels down the first fixed delay element, which exemplarily includes a first aligned waveguide 272 having a first linearly chirped Bragg grating 274. The second polarization component travels down the second delay element 280, exemplarily comprising a second waveguide 282 with a second linearly chirped Bragg grating 284. Other, more complicated, chirp patterns may be chosen to perform more specific or higher-order (third, fourth, etc. order) compensation. The waveguides may be birefringent, thereby suppressing coupling between the two polarization modes in each. The differential delay element includes a first waveguide and a second waveguide. The waveguides and the output ports of the splitter are optically coupled and aligned by matching their cores and polarization axes.

The signals are reflected at a reflection point inside the gratings 274 and 284 corresponding to the wavelength of the signal. This point may be varied in the second waveguide 282 by tuning the grating 284 using tuning mechanism 286.

The tuning mechanism 286 is capable of variably adjusting the optical path length of one or both of the reference points, with respect to the split point, by changing the effective period of the grating elements to change the reference reflection point of the signal. Mechanisms for tuning the grating period may include: applying axial mechanical stress to stretch or compress the gratings, applying electric fields to electro-optically control the grating index, applying heat to thermo-optically control the grating index, or using other tuning mechanisms known in the art, such as mechanisms that tune the gratings acoustically and/or mechanically (e.g., by stretching or compressing the gratings).

The waveguides 272 and 282 are exemplarily optical fibers. In specific embodiments, the waveguides 272 and 282 may be optical single-mode polarization-maintaining (PM) fibers, polarizing (PZ) fibers, and/or shaped optical fibers, such as those described in commonly-owned, co-pending U.S. Application Ser. No. 09/515,187, and U.S. Pat. No. 6,459,838, which are both hereby incorporated by reference.

When the signal returns to circulator 250 upon reflection, it will now be compensated for both first order PMD, because of the optical path length difference between the two gratings' reflection points, and fixed chromatic dispersion, because the gratings have a predetermined chirp rate that corresponds to the amount of fixed chromatic dispersion to be compensated. Thus, the average chirp rate of the first grating 274 and the second grating 284 determines the amount of fixed chromatic dispersion compensation.

In the present exemplary embodiment, the first grating and the second grating both have substantially the same reflection profiles and substantially the same chirp rates; and the first and second reference reflection points are at substantially the same optical path length.

Alternatively, prior to adjustment by the first tuning mechanism, the first reflection point of the first grating may be at a shorter or at a longer optical path length from the split point of the beam splitter than the second reflection point. The initial position of the first and second reference reflection points with respect to the split point (i.e., the optical path length of the segment) may be tailored to the particular application. In applications where the expected DGD does not exceed the range of the tuning mechanism, the first and second reference reflection points may be at substantially the same optical path length with respect to the split point. Alternatively, one or the other reference reflection points may be biased, that is, may have a different optical path length, to compensate for all or part of the first order PMD.

Different components of the present invention may be integrated into an integrated optical device, such as a LiNbO$_3$ chip, which contains birefringent waveguides. In one embodiment, the polarization controller and the differential delay line are integrated onto a single LiNbO$_3$ chip. In another embodiment, the polarization dispersion compensator components from neighboring channels in a wavelength division multiplexing (WDM) system may be integrated onto a single LiNbO$_3$ chip. Obviously, integrated optical devices based on other materials systems could also be used.

The signal 246 then goes through a second circulator 252, which provides a return path for the signal upon reflection from a variable chromatic, higher order PMD dispersion compensator 264. The compensator 264 includes a third delay element 290 including a waveguide 292, which contains a tuned third grating 294. In this instance, the grating 294 is non-linearly chirped.

Exemplarily, the waveguides 272, 282 and 292 are single-mode optical fibers. In an exemplary embodiment, the fibers are polarization maintaining fibers. By tuning the grating 294 appropriately using tuning mechanism 296 (such as by applying a stress or temperature gradient), both variable chromatic and higher-order polarization mode dispersion will be dynamically compensated. The amount of chirp in the linearly chirped gratings 274 and 284 must be adjusted to take into account the average chromatic dispersion induced by the non-linearly chirped grating 294 in the succeeding section. The range of chirp values in the non-linearly chirped waveguide grating will then determine the relative range of variable chromatic dispersion compensation.

The illustrated three grating configuration allows for a very flexible range of PMD, chromatic, and variable chromatic dispersion compensation amounts without changing the layout, due to the flexibility in writing different chirp and bandwidth gratings.

Referring back to FIG. 2, an optical tap coupler may be coupled to the output port of the circulator to provide a sample of the output signal to the signal analyzer. The analyzer evaluates the quality of the delay line output signal and provides control signals to the polarization controller and the differential polarization delay unit. Control signals 228 go to the polarization controller 240, the tuning mechanism for the linearly chirped waveguide grating 284 and the tuned non-linearly chirped waveguide grating 294 from a signal analysis module 220 that samples output signal 248. As mentioned previously, the preferred detection methods may depend on the situation.

The arrangement of the dispersion compensation elements in FIG. 2 is exemplary. For example, one may place the variable chromatic/higher-order PMD compensator 264 before the first order PMD/fixed chromatic dispersion compensator 260. One also may use a second polarization controller (not illustrated) before the variable chromatic/higher-order PMD compensator 264 to get higher functionality due to added first order PMD compensation if the tuned non-linearly chirped waveguide grating is a fiber Bragg grating (FBG) written in polarization-maintaining fiber (PMF). Also, the two three-port circulators 250 and 252 could be replaced with a single four-port circulator, eliminating one component.

Figure 3:
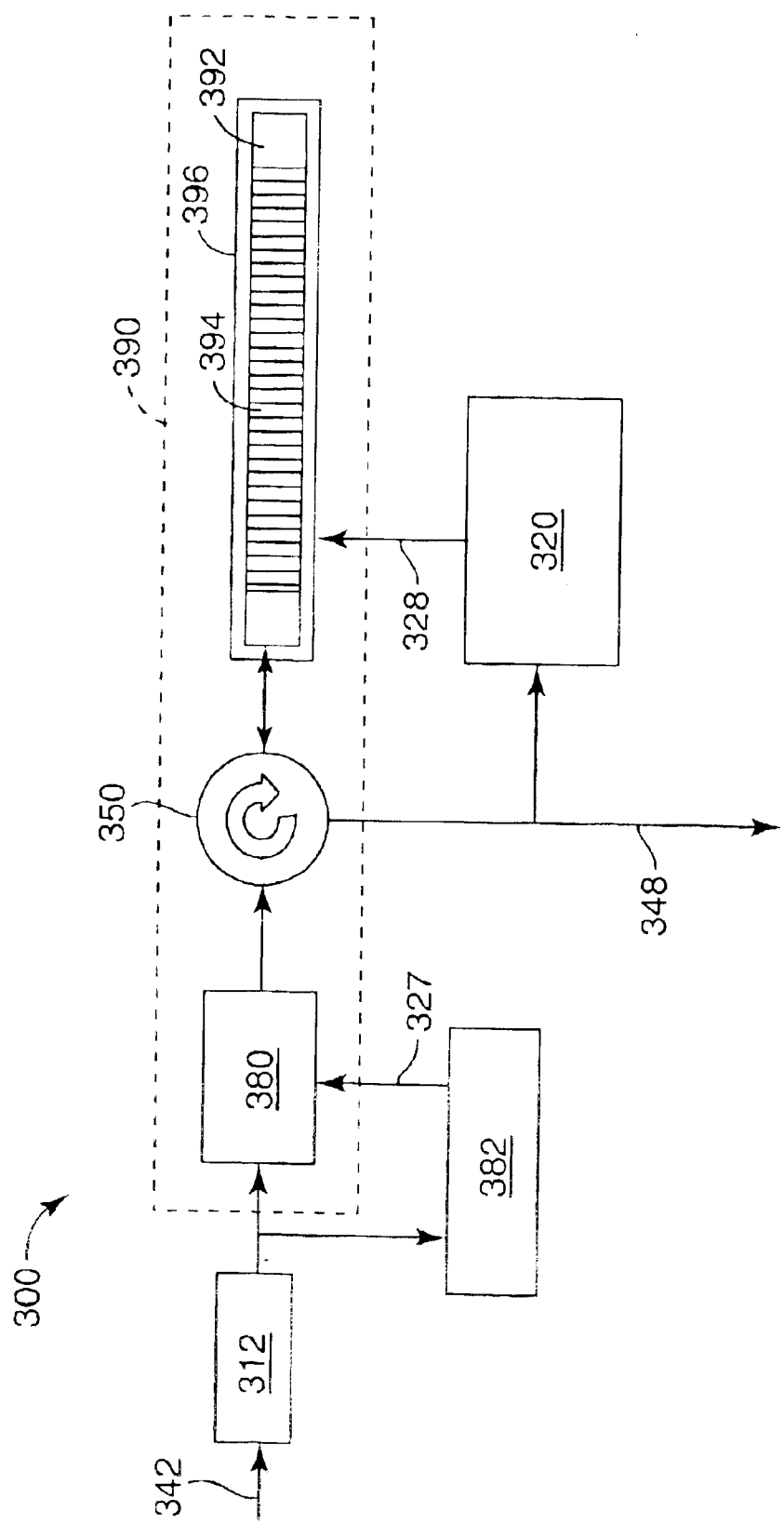
FIG. 3 is a schematic representation of a second embodiment of a dynamic higher-order dispersion compensator in accordance with the present invention.

Another compensator 300, which can accomplish dynamic higher-order dispersion compensation, is shown in the FIG. 3. In the compensator 300, the signal first passes through a fixed chromatic dispersion compensator 312, such that only first order PMD and higher order dispersion components (second order PMD and variable chromatic dispersion) remain. It then goes through a first and second order PMD and dynamic chromatic dispersion compensator comprising a phase modulator 380 and a waveguide 392 containing a non-linearly chirped Bragg grating 394. The phase modulator 380 adds chirp [ps/nm] selectively in time, to parts of the signal. A phase correction module 382 provides a control signal 327 for the phase modulator. The purpose of the phase correction module 382 is to align the phase and period of the chirping afforded by the modulator with the appropriate phase and period of the incoming signal, for example an NRZ encoded signal. The chirped signal then goes through a circulator 350 and into the waveguide 392 containing the non-linearly chirped Bragg grating 394. The non-linearly chirped Bragg grating 394 is tuned by a tuning mechanism 396 to have the proper level of dispersion [ps/nm]. The combination of the chirp applied to parts of the signal and the dispersion imparted by the tuned grating 394 will have the effect of compressing the edges of the pulse in time, thereby compensating for any residual and/or higher order dispersion components.

After returning from the Bragg grating 394, the signal 348 leaves the circulator 350 through an output recirculation port, and is sampled by a signal analysis module 320. The signal analysis module 320 supplies the appropriate control signals to the tuning mechanism 396 to adaptively tune the non-linearly chirped Bragg grating 394. An exemplary candidate for the signal analysis is sub-harmonic filtering since the phase modulator and dispersive element (non-linearly chirped FBG) combination compensates for all types of dispersion. Also, an exemplary location for this method of compensation is at the receiver end of a link, where an electrical representation of the signal is present to tap off from. In this case, there would be a receiver after the circulator 350, such that the signal 348 would be electrical rather than optical.

This approach may be used in combination with other elements. For example, a first order PMD compensator may be used in conjunction with compensator 300 to reduce the polarization dispersion to be compensated. This would be highly advantageous in links with high PMD to reduce the necessary compensation range of the dynamic higher-order dispersion compensator.

An alternative embodiment of FIG. 3 would have the signal analysis module 320 control both the tuned grating 392 and the phase correction module 380 to optimize the combined performance of the chirp added to the signal by the modulator and the dispersion experienced in the grating.

Another exemplary embodiment would use no fixed chromatic dispersion compensation element 312 or a substantially lower or more convenient value of fixed dispersion for the fixed chromatic dispersion compensation element 312. In this case, the relative range of the tunable dispersion element 394 could be adjusted to the proper level to compensate for all dispersion terms. That is, the tunable dispersion element 394 could be adjusted to compensate for fixed and variable chromatic dispersion and the phase modulator 380 could be adjusted such that the combination of the added phase and the dispersion element 394 could compensate for the remaining dispersion. This may afford the overall compensation system much more flexibility and range during the compensation process.

Another exemplary embodiment would have the non-linearly chirped grating 394 written into a highly birefringent waveguide, for example polarization maintaining fiber, and further include a polarization controller to control the polarization of the signal entering the non-linearly chirped grating 394. This embodiment could be implemented either of the two ways described previously—with or without a fixed chromatic dispersion compensation element 312. In the case of the fixed chromatic dispersion compensation element 312 being present the combination of polarization control and a non-linearly chirped Bragg grating could be used to compensate for all or part of the first order polarization mode dispersion. The fixed chromatic dispersion element 312 would compensate for the fixed chromatic dispersion present in the incoming signal. Then, the combination of the phase modulation and the instantaneous value of dispersion could be optimized to compensate for the remaining dispersion components. In the case of the fixed chromatic dispersion compensation element 312 not being present, the remaining terms to be compensated for by the combination of the phase modulation and the dispersion element would also include the fixed chromatic dispersion term.

Figure 4:
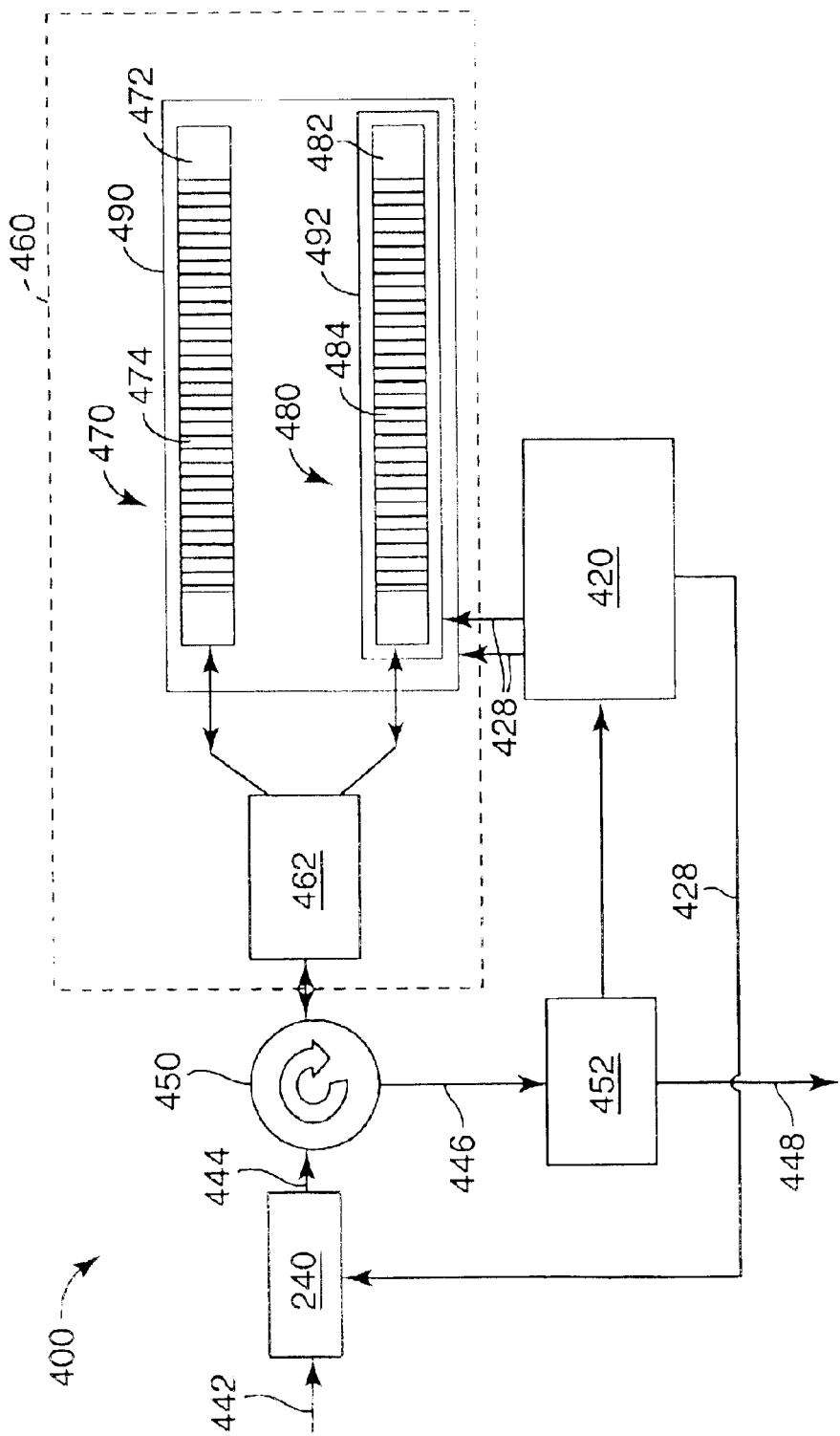
FIG. 4 is a schematic representation of a third embodiment of a dynamic, higher-order dispersion compensator in accordance with the present invention.

FIG. 4 illustrates another embodiment of a compensation system 400 in accordance with the current invention. The system 400 allows for integration of the higher-order dispersion compensation concept into fewer stages. The input signal 442 enters the system 400 through a polarization controller 440, which converts the incoming polarization state of the signal into a signal 444 with a desired state of polarization. After the signal 444 goes through the recirculation port of a circulator 450, it is optically coupled to a polarization beam splitter/combiner 462 of a delay assembly 460. The delay assembly also includes a first delay element 470 and a second delay element 480. The signal 444 is split into its orthogonal components, and each component is directed to an output port of the splitter/combiner 462. The signals simultaneously traverse the first delay element 470, which includes a first waveguide 472 containing a first non-linearly chirped grating 474 and a second waveguide 482 containing a second non-linearly chirped grating 484, and the second delay element 480, which includes a second waveguide 482 containing a second non-linearly chirped grating 484.

The first grating 474 and the second grating 484 have a tuning mechanism 490 that controls both gratings simultaneously. The second grating 484 has an additional tuning mechanism 492 that tunes the grating 484 independently. Fixed chromatic dispersion compensation is accomplished by writing the correct average value of chirp into the non-linearly chirped waveguide gratings 474 and 484. Variable chromatic dispersion compensation and higher-order PMD compensation are achieved by tuning the gratings 474 and 484 in unison, by changing both their temperatures by the same amount, for example. First order PMD compensation is achieved by tuning the second non-linearly chirped grating 484 separately, by stressing it for example. The types of tuning that may be used are not limited to temperature or stress tuning, and either may be used for the unison or separate tuning.

Upon reflection from the gratings, the compensated signal 446 is recombined by the polarization splitter/combiner 462, and proceeds back through the circulator 450 to the circulator output port. An exemplary embodiment of the current invention would include an optical tap coupler 452 and a signal analysis module 420 after the circulator 450. Depending on the detection methods chosen and whether or not feed-forward or feedback algorithms are used, the tap 452 may be located in a different part of the system. The signal analysis module 420 provides control signals 428 to the tuning mechanisms 490 and 492 and to the polarization controller 440.

The method and systems described above may result in a small amount of residual fixed chromatic dispersion induced between the two polarization components of the signal. For small first order PMD amounts this is likely to be acceptable, as shown in the calculation below of an exemplary system based on fiber Bragg gratings.

| | |
|---|---|
| Fixed Chromatic Dispersion Amount: | 700 ps/nm |
| Variable Chromatic Dispersion Amount: | −500 ps/nm to +500 ps/nm |
| Actual Grating Chirp Ranges: | 200 ps/nm to 1200 ps/nm (or 50 pm/mm to 8.33 pm/mm period chirp) |
| Grating Length (example): | 1 meter |
| Chirp rate change per length: | 10 ps/nm per cm |
| DGD Range (example): | 100 ps (or 1 cm reflection point change) |
| Grating Chirp rate change per DGD max Range: | 10 ps/nm |

In an exemplary system, if the incoming first order PMD (DGD) were the maximum expected 100 ps, a grating of the above design may add a residual chromatic dispersion of 10 ps/nm preferentially between the two orthogonal polarization components of the signal. This amount would usually be much lower, since PMD has a Maxwellian distribution with time, such that if the maximum expected amount were 100 ps, the actual amount seen most of the time would be much less. Furthermore, increasing the grating length or changing the design otherwise could reduce the amount further. The above configuration will lead to an extremely flexible, low loss method of compensating for any type or any combinations of types of dispersion in a compact form factor.

In the exemplary embodiment of FIG. 4, the waveguides 472 and 482 are made of polarization maintaining fiber. In an alternate embodiment, the waveguides may be integrated on an integrated optical chip, such as a lithium niobate chip. Further, it may be advantageous to incorporate more of the components of the compensator system into the integrated optical chip, such as the polarization splitter/combiner 462 and the polarization controller 440. An alternative layout for FIG. 4 would be to position the polarization controller 440 between the circulator 450 and the polarization splitter/combiner 462. This would facilitate the integration of some or all of these components together onto an optical chip. For example, an exemplary embodiment may integrate the polarization controller 440, the polarization splitter/combiner 462, and the waveguides 472 and 482 onto one substrate.

Those skilled in the art will appreciate that the present invention may be used in a variety of optical applications where higher-order compensation is desired. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A method for compensating for higher-order dispersion of an incoming optical communications signal, the method comprising the steps of:

a) adjusting the state of polarization of the incoming optical communications signal to correctly align the principal states of polarization of the communications signal to the principal states of polarization of the compensator system;

b) splitting the communications signal into a first and a second orthogonal principal states of polarizations at a split point;

c) directing the first of the polarization states to a first waveguide having a first non-linearly chirped grating having a first reference reflection point;

d) directing the second of the polarization states to a second waveguide having a second non-linearly chirped grating having a chirp pattern substantially similar to that of the first chirped grating and having a second reference reflection point;

e) adjustably varying the chromatic dispersion of the first and second reflections by varying the position of the first and second reflection points along the gratings;

f) adjustably varying the relative optical path lengths between the first and second reflection points and the split point to compensate for polarization dispersion between the first and second orthogonal states of polarization; and g) recombining the first and second polarization states into an output signal.

2. The method of claim 1, the method further comprising the steps of:

a) sampling the quality of the output signal; and b) adaptively adjusting the state of polarization of the incoming signal and the optical path length of the second reflection point with respect to the split point to compensate for first-order polarization mode dispersion in response to the quality of the output signal.

3. The method of claim 1, the method further comprising the steps of:

a) sampling the quality of the output signal; and b) adaptively adjusting the first and second reflection points with respect to the split point in order to compensate for the chromatic dispersion in the signals in response to the quality of the output signal.

4. The method of claim 1, the method further comprising the steps of:

a) sampling the quality of the output signal; and b) adaptively adjusting the state of polarization of the incoming signal and the first and second reflection points with respect to the split point in order to compensate for chromatic and second-order polarization mode dispersion in the signal in response to the quality of the output signal.

5. The method of claim 1, the method further comprising the steps of:

a) sampling the quality of the output signal;

b) adaptively adjusting the state of polarization of the incoming signal;

c) adaptively adjusting the first and second reflection points with respect to the split point; and d) adaptively adjusting the second reflection point with respect to the split point, all in response to the quality of the output signal, to provide higher-order compensation.

6. The method of claim 1, the method further comprising the step of: prior to the step of adjustably varying the optical path length from the second reflection point, tuning the optical path length of at least one of the gratings such that the second reflection point is substantially at the same optical path length from the split point as the first reflection point.

7. The method of claim 1, the method further comprising the step of: prior to the step of adjustably varying the optical path length from the second reflection point with respect to the split point, tuning the optical path length of at least one of the gratings such that the second reflection point has a shorter optical path length from the split point than the first reflection point, wherein the difference in the optical path length is selected according to an expected polarization dispersion delay between the first and second orthogonal states of polarization.

8. A method for compensating for higher-order dispersion of an optical communications signal, the method comprising the steps of:

a) splitting the communications signal into a first and a second orthogonal principal polarization states;

b) directing the first polarization state to a first high-birefringence optical waveguide having a first linearly chirped grating, the first optical waveguide having a first reflection point at a first optical path length;

c) directing the second polarization states to a second tunable high-birefringence optical waveguide having a second linearly chirped grating, the second optical waveguide having a second reflection point at a second optical path length;

d) recombining the first and second polarization states into an output signal;

e) directing the output signal to a third high-birefringence optical waveguide having a non-linearly chirped grating with a reflection point;

f) adjustably varying the second optical path length of the second linearly chirped grating to compensate for polarization dispersion between the first and second orthogonal states of polarization; and g) adjustably varying the optical path in the third grating to compensate for higher-order dispersion in the output signal.

9. The method of claim 8, wherein the second chirped grating has a chirp pattern substantially similar to the first chirped grating, the second grating having a second reflection point that is substantially at the same optical path length from the split point as the first reflection point.

10. The method of claim 8, further comprising the steps of:

a) sampling the output signal; and b) adaptively adjusting the state of polarization of the incoming signal and the optical path length of the second reflection point in response to the quality of the output signal.

11. The method of claim 8, further comprising the steps of:

a) sampling the output signal;

b) adaptively adjusting the second reflection point in the second grating with respect to the split point in response to the quality of the output signal.

12. The method of claim 8, further comprising the steps of:

a) sampling the output signal;

b) adaptively adjusting the state of polarization of the incoming signal;

c) adaptively adjusting the second reflection point of the second grating with respect to the split point; and d) adaptively adjusting the third reflection point of the third grating, all in response to the quality of the output signal.

13. The method of claim 8, wherein the first and second gratings measure at least 5 centimeters in length.

14. A method for compensating for higher-order dispersion of an incoming optical communications signal, the method comprising the steps of:

a) compensating the signal for first order polarization mode dispersion;

b) compensating the signal for second order polarization mode dispersion; and c) compensating the signal for variable chromatic dispersion.

15. The method of claim 14, further comprising the step of compensation for fixed chromatic dispersion.

16. The method of claim 14, further comprising the step of controlling the polarization of the incoming signal.

17. The method of claim 14, further comprising the step of monitoring the signal after the compensating steps and tuning the degree of compensation base on the monitoring.

18. The method of claim 14, wherein the step of compensating the signal for first order polarization mode dispersion comprises the steps of:

a) controlling the polarization of the signal;

b) splitting the signal into a first and a second orthogonal polarization components;

c) reflecting the first polarization component in a fixed linearly chirped grating;

d) reflecting the second polarization component in a tuned linearly chirped grating; and e) recombining the first and the second polarization components.

19. The method of claim 14, wherein the step of compensating the signal for second order polarization mode dispersion comprises the step of reflecting the signal in a tuned non-linearly chirped grating having a length of at least 1 meter.

* * * * *

UNITED STATES PATENT AND TRADEMARK OFFICE
CERTIFICATE OF CORRECTION

PATENT NO. : 6,829,409 B2
DATED : December 7, 2004
INVENTOR(S) : Koch, Barry J.

It is certified that error appears in the above-identified patent and that said Letters Patent is hereby corrected as shown below:

Column 1,
Line 14, delete "Dec. 3, 2001" and insert -- Dec. 31, 2001 -- therefor.

Column 2,
Line 14, delete "ps km$^{1/2}$" and insert -- ps/km$^{1/2}$ -- therefor.

Column 17,
Line 9, delete "base" and insert -- based -- therefor.

Signed and Sealed this

Twenty-fourth Day of May, 2005

JON W. DUDAS
*Director of the United States Patent and Trademark Office*